(12) United States Patent
D'souza

(10) Patent No.: US 12,301,601 B2
(45) Date of Patent: May 13, 2025

(54) SYSTEM AND METHOD TO MANAGE A NETWORK SECURITY OF A COMPUTING ENVIRONMENT (CE)

(71) Applicant: Richard D'souza, Langley (CA)

(72) Inventor: Richard D'souza, Langley (CA)

( * ) Notice: Subject to any disclaimer, the term of this patent is extended or adjusted under 35 U.S.C. 154(b) by 291 days.

(21) Appl. No.: 17/903,018

(22) Filed: Sep. 5, 2022

(65) Prior Publication Data

US 2023/0069857 A1     Mar. 9, 2023

Related U.S. Application Data

(60) Provisional application No. 63/249,969, filed on Sep. 29, 2021.

(51) Int. Cl.
| | |
|---|---|
| *H04L 29/06* | (2006.01) |
| *G06F 21/32* | (2013.01) |
| *G06F 21/85* | (2013.01) |
| *H04L 9/08* | (2006.01) |
| *H04L 9/30* | (2006.01) |
| *H04L 9/40* | (2022.01) |

(52) U.S. Cl.
CPC .......... *H04L 63/1425* (2013.01); *G06F 21/32* (2013.01); *G06F 21/85* (2013.01); *H04L 9/0819* (2013.01); *H04L 9/0822* (2013.01); *H04L 9/3066* (2013.01); *H04L 63/08* (2013.01); *H04L 63/1416* (2013.01); *H04L 63/1433* (2013.01); *H04L 2463/082* (2013.01)

(58) Field of Classification Search
CPC . H04L 63/08; H04L 63/1425; H04L 63/1416; H04L 63/1433; H04L 9/0819
See application file for complete search history.

(56) References Cited

U.S. PATENT DOCUMENTS

| | | | |
|---|---|---|---|
| 2018/0375892 A1* | 12/2018 | Ganor | G06Q 10/0635 |
| 2019/0253431 A1* | 8/2019 | Atanda | G06F 21/62 |
| 2021/0075814 A1* | 3/2021 | Bulut | H04L 63/20 |
| 2021/0133670 A1* | 5/2021 | Cella | G06N 3/044 |
| 2021/0250369 A1* | 8/2021 | Åvist | G06F 21/552 |
| 2021/0342836 A1* | 11/2021 | Cella | H04L 9/3239 |
| 2022/0036302 A1* | 2/2022 | Cella | G06N 20/00 |
| 2022/0224724 A1* | 7/2022 | Bazalgette | G06F 21/554 |
| 2022/0232020 A1* | 7/2022 | Kandachar Sridhara Rao | H04L 63/1466 |
| 2023/0069857 A1* | 3/2023 | D'souza | H04L 9/0819 |

* cited by examiner

*Primary Examiner* — Dao Q Ho
(74) *Attorney, Agent, or Firm* — RC Trademark Company

(57) ABSTRACT

The present invention relates to management of network security of a computing environment. The method may include; utilizing an Artificial intelligence (AI) node to enable management of one or more physical assets and one or more digital assets of the CE, wherein the management comprises automatic control of at least one task related to access of data and communications thereof, wherein the at least one task is selected from: locking, unlocking, encryption, decryption, activation, and deactivation; detecting a non-desired event, which occurred at one or more physical assets and one or more digital assets; analysing the detected non-desired event through a machine learning technique to determine a customized recovery plan and a tailored protection protocol against the detected non-desired event.

5 Claims, 2 Drawing Sheets

SYSTEM AND METHOD TO MANAGE A NETWORK SECURITY OF A COMPUTING ENVIRONMENT (CE)

FIELD OF THE INVENTION

The present invention relates generally to cybersecurity, more particularly, to manage a network security of a computing environment (CE).

BACKGROUND

The background description includes information that may be useful in understanding the present invention. It is not an admission that any of the information provided herein is prior art or relevant to the presently claimed invention, or that any publication specifically or implicitly referenced is prior art.

Generally, protection of information systems against theft, malicious attacks, worms, trozans, virus, ransomware etc., are critical component of cybersecurity. Cybersecurity systems rely on countermeasures, such as systems and processes, to find threats, weaknesses, or attacks as well as to stop, lessen, or warn about potential harm. Systems that regulate physical and virtual access to hardware, software, and data, as well as social engineering systems that work to prevent operator error-intentional, unintentional, or brought on by being duped into departing from secure procedures— are all examples of cybersecurity countermeasures.

Due to the rising reliance on computer systems, the widespread use of the internet, and the rise of "smart" gadgets like smartphones, televisions, and other items constituting an ever-expanding Internet of Things, the cybersecurity profession is becoming more and more imperative. Several researchers highlighted sectors of national and international business, government, and economies that are impacted by cybercrime.

The simplest solution to the cybersecurity dilemma is creativity. The profitable nature of their illegal activity drives these nimble cybercriminals. As a result, compared to the mostly bureaucratic enterprises they target, they are more eager and able to innovate. The result is that the field of cybersecurity countermeasures has been unable to keep up due to limitations imposed by legal systems that are forced to depend on national laws in order to control the essentially borderless internet, as well as by countermeasures systems that are ingrained with bureaucracy.

Even though, several network security mechanisms have made immense contribution in prohibiting cybercrime, several drawbacks are still associated, such as, high error rate, inaccuracy in detection of cyber-attacks, etc. results in a low acceptance condition among common users.

The existing technological solutions for network security suffers from various limitations such as, inaccuracy in detection, inappropriate recovery plan, etc. Thus, there remains a need for further contributions in this area of technology. More specifically, a need exists in the area of technology to manage a network security of a computing environment (CE).

All references, including publications, patent applications, and patents, cited herein are hereby incorporated by reference to the same extent as if each reference were individually and specifically indicated to be incorporated by reference and were set forth in its entirety herein.

SUMMARY

The present invention relates generally to cybersecurity, more particularly, to manage a network security of a computing environment (CE).

This summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

The following paragraphs provide additional support for the claims of the subject application.

In an aspect the present disclosure provides a system to manage a network security of a computing environment (CE), the system comprising: the CE comprising: an Artificial intelligence (AI) node is arranged to enable management of one or more physical assets and one or more digital assets of the CE, wherein the management comprises automatic control of at least one task related to access of data and communications thereof, wherein the at least one task is selected from: locking, unlocking, encryption, decryption, activation, and deactivation; an AI detection node is arranged to detect a non-desired event, which occurred at one or more physical assets and one or more digital assets, wherein the non-desired event is selected from: a network physical breach; a Public Key Infrastructure (PKI) attack; a Secure Socket Layer (SSL) attack; and a cryptoanalysis threat; and an AI response node is configured to analyse the detected non-desired event through a machine learning technique to determine a customized recovery plan and a tailored protection protocol against the detected non-desired event.

In another aspect the present disclosure provides a method for managing security of a computing environment (CE), the method comprising: utilizing an Artificial intelligence (AI) node to enable management of one or more physical assets and one or more digital assets of the CE, wherein the management comprises automatic control of at least one task related to access of data and communications thereof, wherein the at least one task is selected from: locking, unlocking, encryption, decryption, activation, and deactivation; detecting a non-desired event, which occurred at one or more physical assets and one or more digital assets, wherein the non-desired event is selected from: a network physical breach; a Public Key Infrastructure (PKI) attack; a Secure Socket Layer (SSL) attack; and a cryptoanalysis threat; and analysing the detected non-desired event through a machine learning technique to determine a customized recovery plan and a tailored protection protocol against the detected non-desired event.

In an embodiment, the AI node activates a multi-factor authentication (MFA) to enable access of one or more physical assets and one or more digital assets of the CE.

In an embodiment, the AI node utilizes an encryption key to enable access of data by one or more physical assets and one or more digital assets.

In an embodiment, the AI response node determines a first threat score, a second threat score, a third threat score and a fourth threat score, correspond to the network physical breach, the PKI attack, the SSL attack and the cryptoanalysis threat, respectively.

In an embodiment, the AI response node determines an overall threat score based on the determined first threat score, the second threat score, the third threat score and the fourth threat score.

In an embodiment, the AI response node generates an alert notification to depict the determined overall threat score.

In an embodiment, the AI response node determines the customized recovery plan and the tailored protection protocol based on the determined overall threat score.

In an embodiment, the detected non-desirable event includes cross site resource sharing (CORS).

In an embodiment, the AI detection node determines a source of detected non-desirable event to determine the tailored protection protocol.

In an embodiment, the AI response node enables a backup of the data upon detection of the non-desirable event.

In an embodiment, the AI node executes an authentication mechanism for unlocking the one or more physical assets after being locked upon detection of the non-desirable event.

In an embodiment, the AI node isolates the one or more physical assets upon detection of the non-desirable event.

In an embodiment, the AI node reconnect the isolated one or more physical assets, upon receiving a confirmation signal from the AI response node after re-authentication.

BRIEF DESCRIPTION OF THE DRAWINGS

Embodiments will now be described in more detail in relation to the enclosed drawings, in which.

DETAILED DESCRIPTION

The following is a detailed description of exemplary embodiments to illustrate the principles of the invention. The embodiments are provided to illustrate aspects of the invention, but the invention is not limited to any embodiment. The scope of the invention encompasses numerous alternatives, modifications and equivalent; it is limited only by the claims.

Numerous specific details are set forth in the following description in order to provide a thorough understanding of the invention. However, the invention may be practiced according to the claims without some or all of these specific details. For the purpose of clarity, technical material that is known in the technical fields related to the invention has not been described in detail so that the invention is not unnecessarily obscured.

The present invention relates generally to cybersecurity, more particularly, to manage a network security of a computing environment (CE).

Figure 1:
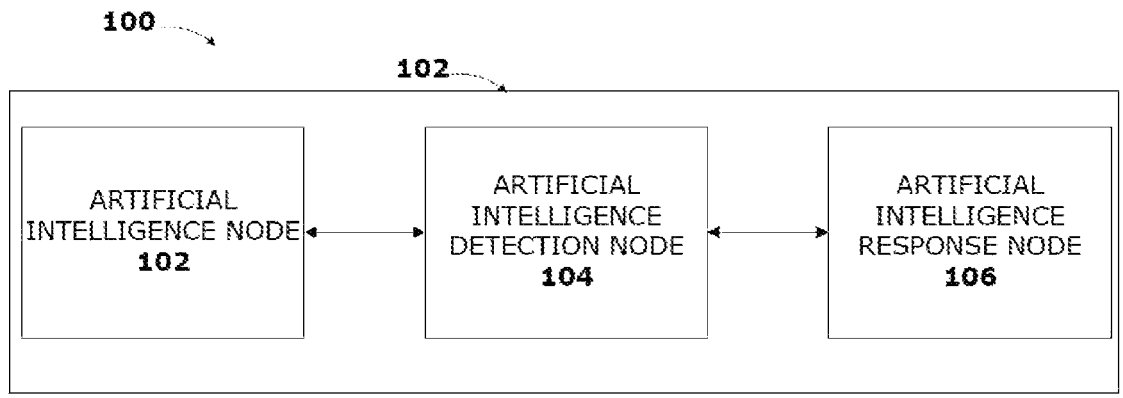
FIG. 1 illustrates an architecture to manage a network security of a computing environment (CE) and components/elements thereof, in accordance to embodiments of present disclosure.

FIG. 1 illustrates an architecture 100 to manage a network security of a computing environment (CE) and components/elements thereof, in accordance to embodiments of present disclosure.

As illustrated, the CE 102 may include an artificial intelligence (AI) node 104, an AI detection mode 106 and an AI response node 108. All three AI node 104, AI detection mode 106 and AI response node 108 can be operatively coupled with each other through a communication network. The communication can be bidirectional i.e. any of the 104, 106 and 108 can communicate with each other.

Figure 2:
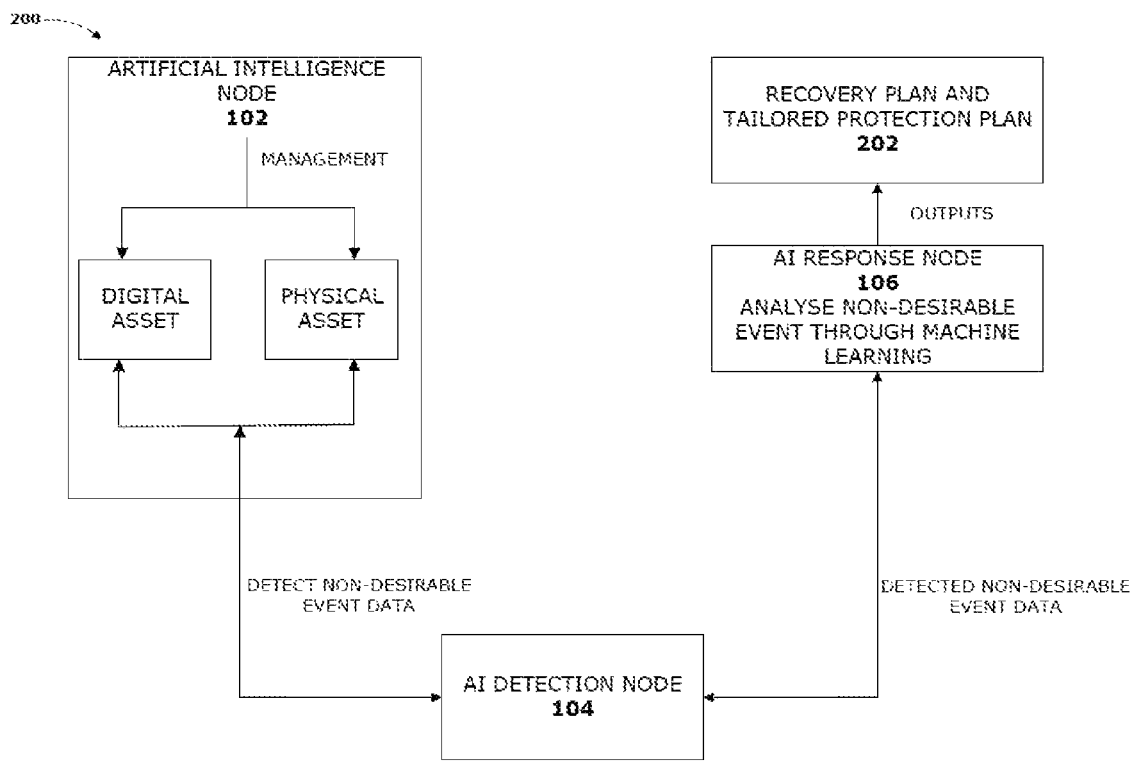
FIG. 2 illustrates detailed representation of CE and components/elements thereof, in accordance to embodiments of present disclosure.

FIG. 2 illustrates detailed representation of CE and components/elements thereof, in accordance to embodiments of present disclosure.

As illustrated, in FIG. 2 there is shown an artificial intelligence (AI) node 104, an AI detection node 106, an AI response node 108 and other known components of an AI based cybersecurity. Data communication means can be arranged to enable communication with different components, and an electrical energy source to provide electrical energy to the one or more components of detailed architecture 200. It can be appreciated that the aforementioned components of system architecture 100 are communicably coupled with each other.

In an embodiment, the AI node 104 can be arranged to enable management of one or more physical assets such as computing nodes, which can be a part of a network. The computing nodes can communicate with each other through known communicating mechanisms. The AI node 104 may enable the management of one or more digital assets of the CE, wherein one or more digital assets can be an instance or a server arrangement which can be associated with humongous database that needs to be secured for integrity of an organization. The management may comprise an automatic control of at least one task related to access of data and communications thereof by monitoring an inbound and outbound traffic from/to the one or physical assets and the one or more digital assets. The at least one task that can be performed by the AI node 104 for the management of one or more physical assets and one or more digital assets can be selected from locking, unlocking, encryption, decryption, activation, and deactivation, wherein the AI node 102 may utilize the two most promising emerging protocols used for encrypting data namely, secure multiparty computation (SMPC) and homomorphic encryption (HE). The SMPC can be a generic cryptographic primitive that enables one or more physical assets and one or more digital assets to jointly compute an arbitrary functionality without revealing their own private inputs and outputs. HE allows one or more physical assets and one or more digital assets to compute analytical functions on encrypted data (ciphertext) without the requirement of decrypting it. HE can be classified in different types according to the mathematical operation types allowed and the number of times these operators can be performed. The encryption algorithm behind HE is based on ring-Learning that results in errors, a highly complex (NP-hard) problem which is, as an added benefit, considered quantum-safe. The AI node 102 may lock/deactivate one or more physical assets and one or more digital assets, upon detection of non-desirable event (by AI detection node 104), which may tamper the encrypted data. The AI node 104 may unlock/activate one or more physical assets and one or more digital assets, after adequate analysis of non-desirable event by AI detection node 108.

In an embodiment, the AI detection node 106 can be arranged to detect the non-desired event, which may occur at one or more physical assets and one or more digital assets, wherein the non-desirable event may lead to gain of unauthorized access, stealing of data or damaging of one or more physical assets and one or more digital assets. The non-desirable event that may hamper the integrity of data of an organization can be a network physical breach such as access to server or instances or even server rooms in some cases, access to the one or more physical assets and one or more digital assets by stealing the password, etc. The non-desirable event that may hamper the integrity of data of an organization can be a Public Key Infrastructure (PKI) attack, which may relate to an unauthorized access of set of roles, policies, hardware, software and procedures needed to create, manage, distribute, use, store and revoke digital certificates and manage PKI. The non-desirable event that may hamper the integrity of data of an organization can be a Secure Socket Layer (SSL) attack, wherein the SSL refers to encryption of a link between a web server and a browser which ensures that all data passed between them remain private and free from attack. The non-desirable event that may hamper the integrity of data of an organization can be a cryptoanalysis threat, wherein, cryptanalysis can be the decryption and analysis of codes, ciphers or encrypted text. Cryptanalysis uses mathematical formulas to search for algorithm vulnerabilities and break into cryptography or information security systems.

In an embodiment, the AI response node 108 can be arranged to analyse the detected non-desired event through a machine learning technique (which can be selected from Linear Regression Algorithm, Logistic Regression Algorithm, Decision Tree, SVM, Naïve Bayes, KNN, K-Means Clustering, Random Forest, Apriori, PCA, etc.) to determine a tailored protection protocol which can be selected from assigning roles (based on identity) to the persons utilizing one or more physical assets within the network. Two factor authentication can be assigned for utilizing the one or more physical assets or one or more digital assets, by rotating passwords for access of the one or more physical assets or one or more digital assets, by granting limited access by implementing access management policies etc. The AI response node 108 may determine a customized recovery plan by creating a backup (by creating read replica) of the one or more digital assets, via a snap shot of one or more digital assets, etc.

In an embodiment, the AI node 104 may activate a multi-factor authentication (MFA) for access of one or more physical assets and one or more digital assets of the CE, wherein MFA can be a method in which a user is granted access to a website or application only after successfully presenting two or more pieces of evidence (or factors) to an authentication mechanism: knowledge (something only the user knows), possession (something only the user has), and inherence (something only the user is). MFA protects user data, which may include personal identification or financial assets from being accessed by an unauthorised third party that may have been able to discover, for example, a single password.

In an embodiment, the AI node 104 may utilize an encryption key to enable access of data by one or more physical assets and one or more digital assets, wherein the encryption key can be typically a random string of bits generated specifically to scramble and unscramble data. Encryption keys are created using algorithms designed to ensure that each key is unique and unpredictable. The longer the key constructed this way, the harder it is to break the encryption code. The most common methods of encryption use 256-bit AES algorithm keys to encrypt data. 256-bit AES is the encryption standard currently recognized by the government bodies, which allows three different key lengths. 256-bit keys are the longest allowed by AES.

In an embodiment, the AI response node 108 may determine a first threat score, a second threat score, a third threat score and a fourth threat score, correspond to the network physical breach, the PKI attack, the SSL attack and the cryptoanalysis threat, respectively, wherein the first threat score refers to a magnitude or severity of the network physical breach. The second threat score depicts the severity of the PKI attack within the CE, which can be a subject for analysis to determine the extent of harm done by attackers.

Whereas the third threat score may depict the magnitude of harm caused by the attackers due to the SSL attack. On the other hand, the fourth threat score depicts the severity of the cryptoanalysis threat.

In an embodiment, the AI response node 108 may determine an overall threat score based on the determined first threat score, the second threat score, the third threat score and the fourth threat score by applying a machine learning technique (which can be selected from artificial neural network (ANN), convolutional neural network (CNN), hybrid markov model (HMM), artificial intelligence (AI), deep learning, etc.), which can be utilized in determination of severity of each of the non-desirable events. The determined overall threat score may vary in accordance with the first threat score, the second threat score, the third threat score and the fourth threat score, respectively.

In an embodiment, the AI response node 106 may generate an alert notification on one or more physical nodes to depict the determined overall threat score, based on which the users may take necessary steps from their side. The necessary steps may include, alteration of password, updation of anti-virus, etc.

In an embodiment, at 202, the AI response node 108 may output the customized recovery plan and the tailored protection protocol based on the determined overall threat score, because a lesser overall threat score may depict a mild non-desirable event, whereas a higher overall threat score may depict a severe non-desirable event. The tailored protection protocol may include deactivation of every physical asset and every digital asset. On the other hand, the tailored protection protocol may include deactivation of one or more physical assets and one or more digital assets.

In an embodiment, the detected non-desirable event includes cross site resource sharing (CORS), which can be a mechanism that allows restricted resources on a web page to be requested from another domain outside the domain from which the first resource was served. A web page may freely embed cross-origin images, stylesheets, scripts, iframes, and videos. Certain "cross-domain" requests, notably Ajax requests, are forbidden by default by the same-origin security policy. CORS may define a way in which a browser and server can interact to determine whether it is safe to allow the cross-origin request. CORS may allow for more freedom and functionality than purely same-origin requests, but can be more secure than simply allowing all cross-origin requests.

In an embodiment, the AI detection node 106 may determine a source of the detected non-desirable event to determine the tailored protection protocol, wherein the source can be an internet protocol address, a domain name, a virtual private network, etc. The AI node 102 may deactivate/block the determined source of non-desirable event, to manage the security of the CE.

In an embodiment, the AI response node 108 enables a backup of the data upon detection of the non-desirable event, so that the essential data and the backhand databases may not be hampered, which may result in loss of integrity of organization. The AI response node 106 may enable backup by creating a replica of the one or more digital assets, by taking snapshot of one or more digital assets running on one or more virtual machines.

In an embodiment, the AI node 104 may execute an authentication mechanism for unlocking the one or more physical assets after being locked upon detection of the non-desirable event, wherein the authentication mechanism may be selected from biometric verification, one time password on registered contact number, etc.

In an embodiment, the AI node 104 may isolate the one or more physical assets upon detection of the non-desirable event, so that the detected non-desirable event may not hamper the security of other physical assets. The AI node 102 may append the IP address of the one or more physical assets in a network access control list (NACL), which blocks the inbound and outbound traffic to/from the one or more physical assets.

In an embodiment, the AI node 104 may reconnect the isolated one or more physical assets, upon receiving a confirmation signal from the AI response node 106 after re-authentication by biometric verification, one time password on registered contact number, etc. The reconnection can be established by deleting the IP address of the one or more physical assets from the NACL.

In an aspect, the known network security management mechanisms involve detection of the security threats and a corresponding action to combat the security threat involves a single root device, which may be under extreme load because of being involved in multiple activities. The present disclosure provides a multi-prong approach to detect, response and act, through different devices, thereby distributing the workload.

Figure 3:
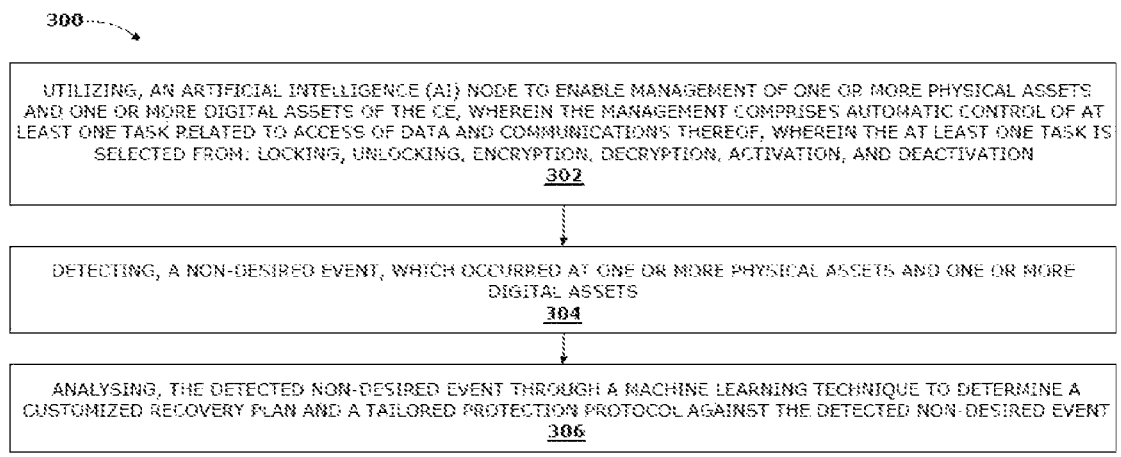
FIG. 3 illustrate exemplarily steps to manage a network security of CE, in accordance with embodiments of the present disclosure.

FIG. 3 illustrate exemplarily steps to manage a network security of a computing environment (CE), in accordance with embodiments of the present disclosure. As illustrated in flow diagram 300, the method may include steps of: at step (302) utilizing an Artificial intelligence (AI) node to enable management of one or more physical assets and one or more digital assets of the CE, wherein the management comprises automatic control of at least one task related to access of data and communications thereof, wherein the at least one task is selected from: locking, unlocking, encryption, decryption, activation, and deactivation; at step (304) detecting a non-desired event, which occurred at one or more physical assets and one or more digital assets; at step (306) analysing the detected non-desired event through a machine learning technique to determine a customized recovery plan and a tailored protection protocol against the detected non-desired event.

A number of implementations have been described. Nevertheless, various modifications may be made without departing from the spirit and scope of the invention. In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors Executable instructions stored on the computer-readable media or memory can include, for example, an operating system, a data management framework, and/or other modules, programs, or applications that are loadable and executable by the processor(s) or any appropriate hardware logic components/CPU(s).

It will be obvious to a person skilled in the art that, as the technology advances, the inventive concept can be implemented in various ways. The above described embodiments are given for describing rather than limiting the disclosure, and it is to be understood that modifications and variations may be resorted to without departing from the spirit and scope of the disclosure as those skilled in the art readily understand. Such modifications and variations are considered to be within the scope of the disclosure and the appended claims. The protection scope of the disclosure is defined by the accompanying claims.

Conditional language such as, among others, include", "including", "comprise", "comprising", "can," "could," "might" or "may," unless specifically stated otherwise, is understood within the context to present that certain examples include, while other examples do not include, certain features, elements and/or steps. Thus, such conditional language is not generally intended to imply that certain features, elements and/or steps are in any way required for one or more examples or that one or more examples necessarily include logic for deciding, with or without user input or prompting, whether certain features, elements and/or steps are included or are to be performed in any particular example. Conjunctive language such as the phrase "at least one of X, Y or Z," unless specifically stated otherwise, is to be understood to present that an item, term, etc. may be any of X, Y, or Z, or a combination or sub-combination thereof. As described above, the exemplary embodiment provides both a method and corresponding apparatus consisting of various modules providing functionality for performing the steps of the method. The modules/engines may be implemented as hardware (embodied in one or more chips including an integrated circuit such as an application specific integrated circuit), or may be implemented as software or firmware for execution by a computer processor. In particular, in the case of firmware or software, the exemplary embodiment can be provided as a computer program product including a computer readable storage structure embodying computer program code (i.e., software or firmware) thereon for execution by the computer processor.

Modifications, additions, or omissions may be made to the systems and apparatuses described herein without departing from the scope of the disclosure. The components of the systems and apparatuses may be integrated or separated. Moreover, the operations of the systems and apparatuses may be performed by more, fewer, or other components. Additionally, operations of the systems and apparatuses may be performed using any suitable logic comprising software, hardware, and/or other logic. As used in this document, "each" refers to each member of a set or each member of a subset of a set.

Many different embodiments have been disclosed herein, in connection with the above description and the drawings. It will be understood that it would be unduly repetitious and obfuscating to literally describe and illustrate every combination and sub-combination of these embodiments. Accordingly, all embodiments may be combined in any way and/or combination, and the present specification, including the drawings, shall be construed to constitute a complete written description of all combinations and sub-combinations of the embodiments described herein, and of the manner and process of making and using them, and shall support claims to any such combination or sub-combination.

The above description is intended to be illustrative, and not restrictive. Although the present disclosure has been described with references to specific illustrative examples and implementations, it will be recognized that the present disclosure is not limited to the examples and implementations described. The scope of the disclosure should be determined with reference to the following claims, along with the full scope of equivalents to which the claims are entitled.

I claim:

1. A method for managing security of a computing environment (CE), the method comprising:
    utilizing an Artificial intelligence (AI) node to enable management of one or more physical assets and one or more digital assets of the CE, wherein the management comprises automatic control of at least one task related to access of data and communications thereof, wherein the at least one task is selected from: locking, unlocking, encryption, decryption, activation, and deactivation;
    detecting a non-desired event, which occurred at one or more physical assets and one or more digital assets, wherein the non-desired event is selected from:
    a network physical breach;
    a Public Key Infrastructure (PKI) attack;
    a Secure Socket Layer (SSL) attack; and
    a cryptoanalysis threat; and
    analysing, using an AI response node, the detected non-desired event through a machine learning technique to determine a customized recovery plan and a tailored protection protocol against the detected non-desired event, wherein the AI response node determines a first threat score, a second threat score, a third threat score and a fourth threat score, correspond to the network physical breach, the PKI attack, the SSL attack and the cryptoanalysis threat, respectively and an overall threat score based on the determined first threat score, the second threat score, the third threat score and the fourth threat score.

2. The method in claim 1, wherein the AI node activates a multi-factor authentication (MFA) to enable access of one or more physical assets and one or more digital assets of the CE.

3. The method in claim 1, wherein the AI node utilizes an encryption key to enable access of data by one or more physical assets and one or more digital assets.

4. The method in claim 1, wherein the AI response node generates an alert notification to depict the determined overall threat score.

5. The method in claim 1, wherein the AI response node determines the customized recovery plan and the tailored protection protocol based on the determined overall threat score.

* * * * *